US008660222B2

(12) United States Patent
Ozaki

(10) Patent No.: US 8,660,222 B2
(45) Date of Patent: Feb. 25, 2014

(54) WIRELESS RECEPTION DEVICE, WIRELESS RECEPTION METHOD, AND WIRELESS COMMUNICATION SYSTEM

(75) Inventor: Kazuyuki Ozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 166 days.

(21) Appl. No.: 13/253,073

(22) Filed: Oct. 5, 2011

(65) Prior Publication Data

US 2012/0087432 A1 Apr. 12, 2012

(30) Foreign Application Priority Data

Oct. 8, 2010 (JP) ................................ 2010-228636

(51) Int. Cl.
*H03D 1/06* (2006.01)

(52) U.S. Cl.
USPC ............................. 375/346; 375/316; 455/130

(58) Field of Classification Search
USPC ......................................................... 375/346
See application file for complete search history.

(56) References Cited

U.S. PATENT DOCUMENTS

| 2004/0123227 | A1* | 6/2004 | Lee et al. ........................ 714/792 |
| 2004/0180658 | A1* | 9/2004 | Uchida et al. .................. 455/436 |
| 2005/0152465 | A1* | 7/2005 | Maltsev et al. ................. 375/260 |
| 2005/0190800 | A1* | 9/2005 | Maltsev et al. ................. 370/914 |
| 2007/0165732 | A1* | 7/2007 | Gerlach ......................... 375/260 |
| 2007/0297323 | A1* | 12/2007 | Seki ............................... 370/208 |
| 2008/0240028 | A1* | 10/2008 | Ding et al. ..................... 370/329 |
| 2010/0002574 | A1* | 1/2010 | Kim et al. ....................... 370/210 |
| 2010/0097998 | A1* | 4/2010 | Nishio et al. ................... 370/328 |
| 2010/0166126 | A1* | 7/2010 | Matsumura et al. ........... 375/350 |
| 2010/0261441 | A1* | 10/2010 | Imamura ........................ 455/101 |
| 2010/0303213 | A1* | 12/2010 | Cendrillon et al. ......... 379/32.04 |

FOREIGN PATENT DOCUMENTS

WO WO 2005/117381 12/2005

OTHER PUBLICATIONS

Schmidt, Karsten et al., "Low Complexity Inter-Carrier Interference Compensation for Mobile Reception of DVB-T", Low Complexity Inter-Carrier Interference Compensation for Mobile Reception of DVB-T 9th International OFDM-Workshop 2004, Dresden Sep. 1, 2004, pp. 1-5.

* cited by examiner

*Primary Examiner* — Chieh M Fan
*Assistant Examiner* — Santiago Garcia
(74) *Attorney, Agent, or Firm* — Fujitsu Patent Center

(57) ABSTRACT

A wireless reception device includes a determination section to determine, based on reception power of each of subcarriers of a multicarrier signal and a transfer function of each of the subcarriers, a value relating to an interference component between subcarriers, the interference component being from another subcarrier for each of the subcarriers, with respect to each of the subcarriers, and a removal section to remove the interference component from each of the subcarriers, based on the value relating to the interference component.

15 Claims, 15 Drawing Sheets

WIRELESS RECEPTION DEVICE, WIRELESS RECEPTION METHOD, AND WIRELESS COMMUNICATION SYSTEM

CROSS-REFERENCE TO RELATED APPLICATION

This application is based upon and claims the benefit of priority of the prior Japanese Patent Application No. 2010-228636, filed on Oct. 8, 2010, the entire contents of which are incorporated herein by reference.

FIELD

Embodiments described herein relate to a wireless reception device, a wireless reception method, and a wireless communication system.

BACKGROUND

There has been a wireless communication system in which communication is performed using a multicarrier signal. When a terminal or a base station moves in such a wireless communication system, interference between subcarriers (Inter Carrier Interference: ICI) may occur owing to Doppler effect. When interference occurs between subcarriers, a transmission characteristic may be deteriorated.

SUMMARY

According to an aspect of the embodiments discussed herein, a wireless reception device includes a determination section to determine, based on reception power of each of subcarriers of a multicarrier signal and a transfer function of each of the subcarriers, a value relating to an interference component between subcarriers, the interference component being from another subcarrier for each of the subcarriers, with respect to each of the subcarriers, and a removal section to remove the interference component from each of the subcarriers, based on the value relating to the interference component.

Additional objects and advantages of the embodiments will be set forth in part in the description which follows, and in part will be obvious from the description, or may be learned by practice of the embodiments. The object and advantages of the embodiments will be realized and attained by means of the elements and combinations particularly pointed out in the appended claims.

It is to be understood that both the foregoing summary description and the following detailed description are exemplary and explanatory and are not restrictive of the embodiments, as claimed.

DESCRIPTION OF EMBODIMENTS

Figure 1:
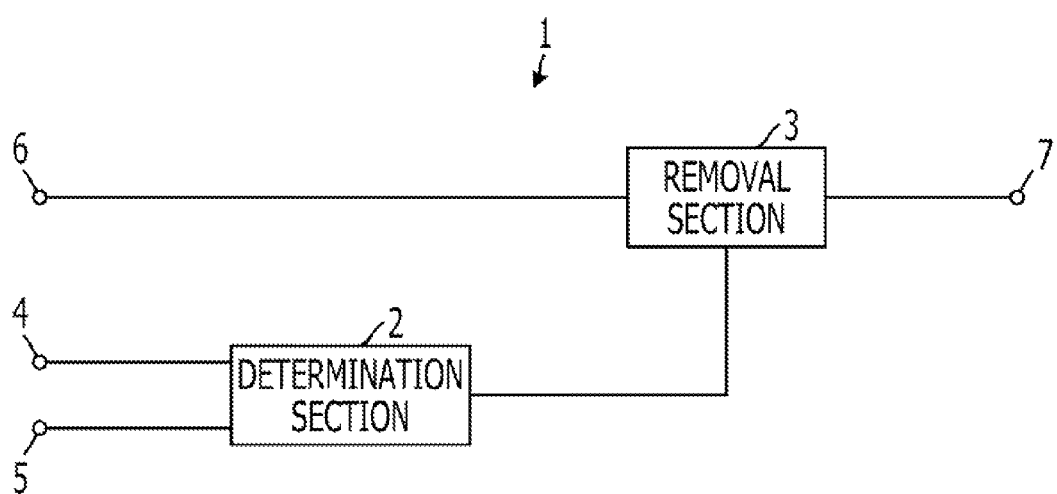
FIG. 1 is a block diagram illustrating a wireless reception device according to a first embodiment.

Hereinafter, embodiments will be described with reference to accompanying drawings. Each of a wireless reception device, a wireless reception method, and a wireless communication system determines the subcarrier of an ICI component to be removed from each subcarrier, based on the reception power and the ICI transfer function of each subcarrier, and removes the ICI component from each subcarrier based on the determination. In the following description of each embodiment, a same symbol is assigned to a same configuration element, and a redundant description will be omitted.

While inventing the embodiments, observations were made regarding a related art. Such observations include the following, for example.

As related art, a method for suppressing the deterioration of a transmission characteristic occurring owing to interference between subcarriers is described (refer to Karsten Schmidt et al., "Low Complexity Inter-Carrier Interference Compensation for Mobile Reception of DVB-T" (9th International OFDM-Workshop 2004, Dresden, p. 72-76), for example).

First, the channel $H_k(t)$ of each subcarrier of a symbol is estimated. Each subcarrier is subjected to tentative equalization and tentative decision, and hence a transmission signal replica $\hat{X}_k(t)$ is obtained. "^X" indicates that "^" is indexed on "X". If it is assumed that channel estimation values located anterior and posterior to the corresponding symbol are $H_k(t-1)$ and $H_k(t+1)$ with respect to each subcarrier, respectively, the slope $H'_k(t)$ of a channel estimation value is expressed based on the following Expression (1). "t" indicates a time. $T_s$ indicates a symbol length of an Orthogonal Frequency Division Multiplexing method (OFDM).

$$H'_k(t) = (H_k(t+1) - H_k(t-1))/2T_s \tag{1}$$

Using $H'_k(t)$ and a constant matrix $\psi$, an ICI transfer function matrix $C(t)$ is expressed by the following Expression (2). "$h_{m,n}(t)$" indicates an ICI transfer function from an n-th subcarrier in an m-th subcarrier.

$$C(t) = \begin{bmatrix} 0 & h_{0,1}(t) & \cdots & h_{0,N-1}(t) \\ h_{1,0}(t) & 0 & \cdots & h_{1,N-1}(t) \\ \vdots & \vdots & \ddots & \vdots \\ h_{N-1,0}(t) & h_{N-1,1}(t) & \cdots & 0 \end{bmatrix} = \Psi \text{diag}(H'_k(t)) \quad (2)$$

ψ is expressed by the following Expression (3). "diag(H'$_k$(t))" is expressed by the following Expression (4). N indicates the number of points of Fast Fourier Transform (FFT). ξ (n=0 to N−1) is expressed by the following Expression (5).

$$\Psi = \begin{bmatrix} 0 & \xi_1 & \cdots & \xi_{N-1} \\ \xi_{-1} & 0 & & \xi_{N-2} \\ \vdots & \vdots & \ddots & \vdots \\ \xi_{1-N} & \xi_{2-N} & \cdots & 0 \end{bmatrix} \quad (3)$$

$$\text{diag}(H'_k(t)) = \begin{bmatrix} H'_0(t) & 0 & \cdots & 0 \\ 0 & H'_1(t) & & \vdots \\ \vdots & & \ddots & 0 \\ 0 & \cdots & 0 & H'_{N-1}(t) \end{bmatrix} \quad (4)$$

$$\xi_n = -\frac{1}{2} - \frac{j}{2\tan(\pi n/N)} \quad (5)$$

Using the ICI transfer function, the ICI component of the number G of one-sided subcarriers to be removed, as an interference component (ICI component), from a reception signal $Y_k(t)$ is calculated. The ICI component is subtracted from the reception signal $Y_k(t)$. The number G of one-sided subcarriers to be removed from the reception signal $Y_k(t)$ is preliminarily defined. A reception signal $Y'_k(t)$ after the subtraction of the ICI component is expressed by the following Expression (6).

$$Y'_k(t) = Y_k(t) - \sum_{\substack{k'=k-G \\ k' \neq k}}^{k+G} h_{k,k'}(t)\hat{X}_{k'}(t) \quad (6)$$

In addition, the number G of one-sided subcarriers to be removed, as an ICI component, from the reception signal may also be obtained from the value of an average SINR (Signal-to-Interference and Noise Ratio: signal power vs. interference power/noise power ratio), measured for a constant interval. The average SINR after the removal of the ICI component is expressed by the following Expression (7). "$f_dT$" indicates a normalized Doppler frequency. $\sigma^2$ indicates noise power. G where SINR expressed by the following Expression (7) exceeds a threshold value is calculated, and the ICI component is removed from the reception signal based on the value of G.

$$SINR = \frac{1}{\frac{(f_dT)^2}{2}\left(\sum_{\substack{k'=0 \\ k' \neq k}}^{N-1} \frac{1}{|k-k'|^2} - \sum_{\substack{k'=k-G \\ k' \neq k}}^{k+G} \frac{1}{|k-k'|^2}\right) + \sigma^2} \quad (7)$$

Incidentally, as a signal processing method of the related art for preventing interference between subcarriers due to Doppler effect, there is a method in which the derivative of a channel transfer function in each subcarrier is estimated based on temporal filtering and the ICI component is removed from the reception signal using estimation data and the estimation derivative of the channel transfer function. The channel transfer function is obtained using a channel estimation method. The estimation data is obtained from the channel transfer function and the reception signal, using a data estimation method.

However, actually the electric power of each subcarrier fluctuates owing to the influence of frequency selective fading. Therefore, if the number of subcarriers to be removed from the reception signal is preliminarily defined or defined based on the average SINR, it is difficult to set the number of subcarriers to be removed from the reception signal to an optimum number. Therefore, in the above-mentioned associated technique, even if the ICI component is removed, it is difficult to efficiently and/or fully improve a reception characteristic.

(First Embodiment)

FIG. 1 is a block diagram illustrating a wireless reception device according to a first embodiment. As illustrated in FIG. 1, a wireless reception device 1 includes a determination section 2 and a removal section 3.

The determination section 2 is connected to an input terminal 4 to which the reception power of each of the subcarriers of a multicarrier signal is input. The determination section 2 is also connected to an input terminal 5 to which the transfer function of each subcarrier is input. The removal section 3 is connected to the determination section 2. The removal section 3 is connected to an input terminal 6 to which each subcarrier of the reception signal is input. The removal section 3 is also connected to an output terminal 7 from which a signal obtained by removing the ICI component from each subcarrier of the reception signal is output.

On the basis of the reception power of each subcarrier and the transfer function of each subcarrier, the determination section 2 determines a value relating to an interference component (ICI component) between subcarriers, the interference component being from another subcarrier for each subcarrier, with respect to each subcarrier. The removal section 3 removes the interference component from each subcarrier, using the value relating to the interference component, determined by the determination section 2, and outputs, to the output terminal 7, a signal from which the interference component has been removed.

According to the first embodiment, a subcarrier to be removed as an ICI component is determined based on the reception power and the transfer function of each subcarrier, with respect to each subcarrier, and based on the determination, a subcarrier to be an ICI component is removed from each subcarrier. For example, since, in a subcarrier whose reception power is high, the influence of an ICI component leaking therein from another subcarrier is small, the subcarrier to be removed as the ICI component decreases. In addition, since, in a subcarrier whose reception power is low, the influence of an ICI component leaking therein from another subcarrier is large, the subcarrier to be removed as the ICI component increases. Accordingly, according to the wireless reception device 1, it is possible to efficiently and/or fully improve the reception characteristic.

(Second Embodiment)

Configuration of Wireless Reception Device

Figure 2:
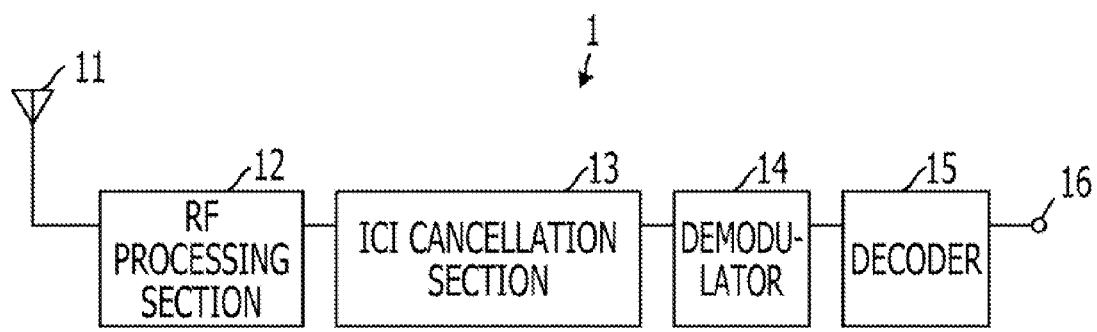
FIG. 2 is a block diagram illustrating a whole configuration of a wireless reception device according to a second embodiment.

FIG. 2 is a block diagram illustrating the configuration of a wireless reception device according to a second embodiment. As illustrated in FIG. 2, the wireless reception device 1 includes an antenna 11, a radio frequency (RF) processing section 12, an ICI cancellation section 13, a demodulator 14, and a decoder 15. The wireless reception device 1 receives a multicarrier signal transmitted by a wireless transmission device not illustrated. For example, an OFDM method is cited as an example of a wireless communication method in which wireless communication is performed using a multicarrier signal. For example, the OFDM method is adopted in a communication system such as IEEE 802.16e, Long Term Evolution (LTE), or the like.

The RF processing section 12 is connected to the antenna 11. The ICI cancellation section 13 is connected to the RF processing section 12. The demodulator 14 is connected to the ICI cancellation section 13. The decoder 15 is connected to the demodulator 14. The antenna 11 receives a wireless signal transmitted from a wireless transmission device not illustrated. The RF processing section 12 converts the reception signal from a signal in an RF band to a signal in a baseband band.

When the wireless reception device 1 or the wireless transmission device not illustrated moves, an ICI component occurs in each subcarrier of the reception signal owing to Doppler effect. The ICI cancellation section 13 removes an ICI component from each subcarrier of the reception signal. The demodulator 14 demodulates a signal from which the ICI component has been removed. The decoder 15 decodes the demodulated signal to obtain reception data, and outputs the reception data to an output terminal 16.

Description of Main Part Configuration of Wireless Reception Device

Figure 3:
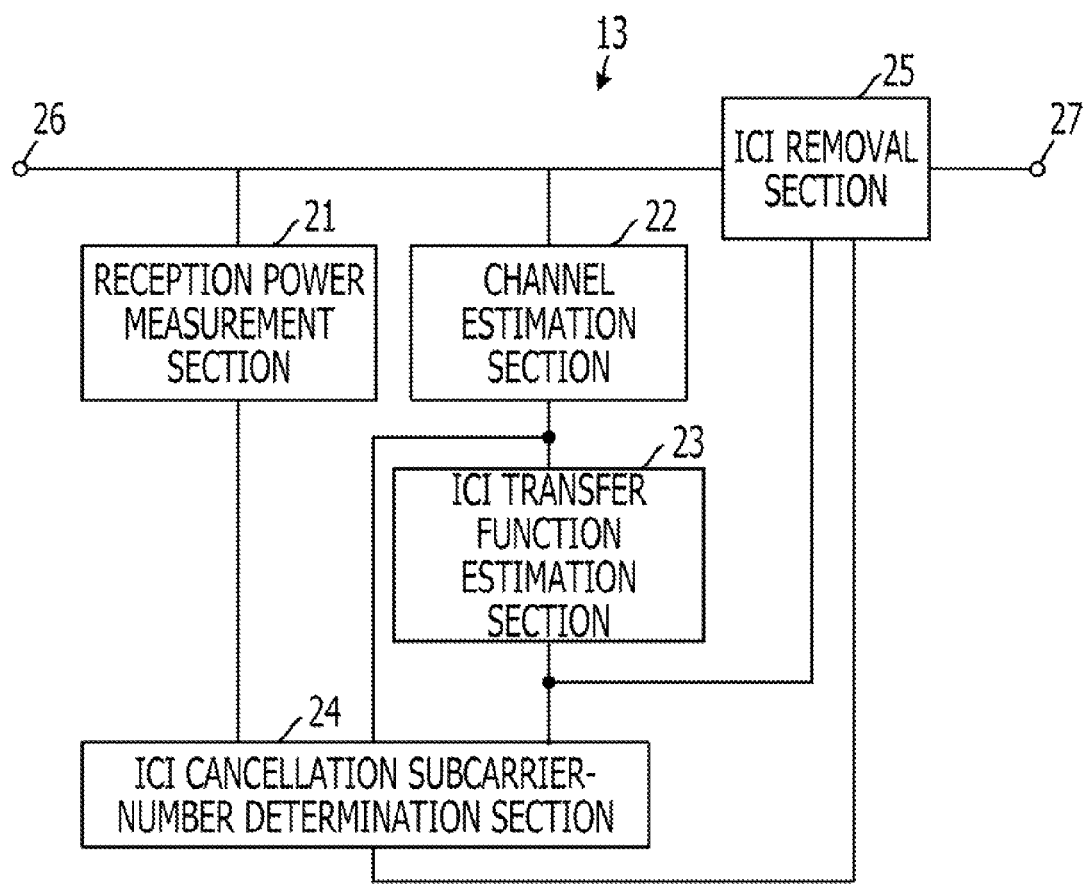
FIG. 3 is a block diagram illustrating a main part configuration of the wireless reception device according to the second embodiment.

FIG. 3 is a block diagram illustrating the main part configuration of the wireless reception device according to the second embodiment. As illustrated in FIG. 3, the ICI cancellation section 13 in the wireless reception device 1 includes a reception power measurement section 21, a channel estimation section 22, an ICI transfer function estimation section 23, an ICI cancellation subcarrier-number determination section 24 for example as a determination section, and an ICI removal section 25 for example as a removal section.

The reception power measurement section 21 and the channel estimation section 22 are connected to an input terminal 26 to which each subcarrier of the reception signal is input. The ICI transfer function estimation section 23 is connected to the channel estimation section 22. The ICI cancellation subcarrier-number determination section 24 is connected to the reception power measurement section 21, the channel estimation section 22, and the ICI transfer function estimation section 23. The ICI removal section 25 is connected to the input terminal 26 to which each subcarrier of the reception signal is input, the ICI transfer function estimation section 23, and the ICI cancellation subcarrier-number determination section 24.

The reception power measurement section 21 measures the reception power of each subcarrier of the reception signal. The channel estimation section 22 estimates a channel between the wireless transmission device not illustrated and the wireless reception device 1. On the basis of a channel estimation value output from the channel estimation section 22, with respect to each subcarrier, the ICI transfer function estimation section 23 estimates the ICI transfer function of another subcarrier leaking, as an ICI component, in the corresponding subcarrier.

On the basis of the reception power measurement value of each subcarrier, output from the reception power measurement section 21, a channel estimation value, and an ICI transfer function estimation value output from the ICI transfer function estimation section 23, the ICI cancellation subcarrier-number determination section 24 determines the number of subcarriers to be ICI components for the corresponding subcarrier and to be removed from the corresponding subcarrier, with respect to each subcarrier. On the basis of the ICI transfer function estimation value and the number of subcarriers to be removed determined by the ICI cancellation subcarrier-number determination section 24, the ICI removal section 25 removes subcarriers to be ICI components from each subcarrier. The ICI removal section 25 outputs, to an output terminal 27, a signal from which the subcarriers to be ICI components have been removed.

Description of ICI Cancellation Subcarrier-Number Determination Unit

Figure 4:
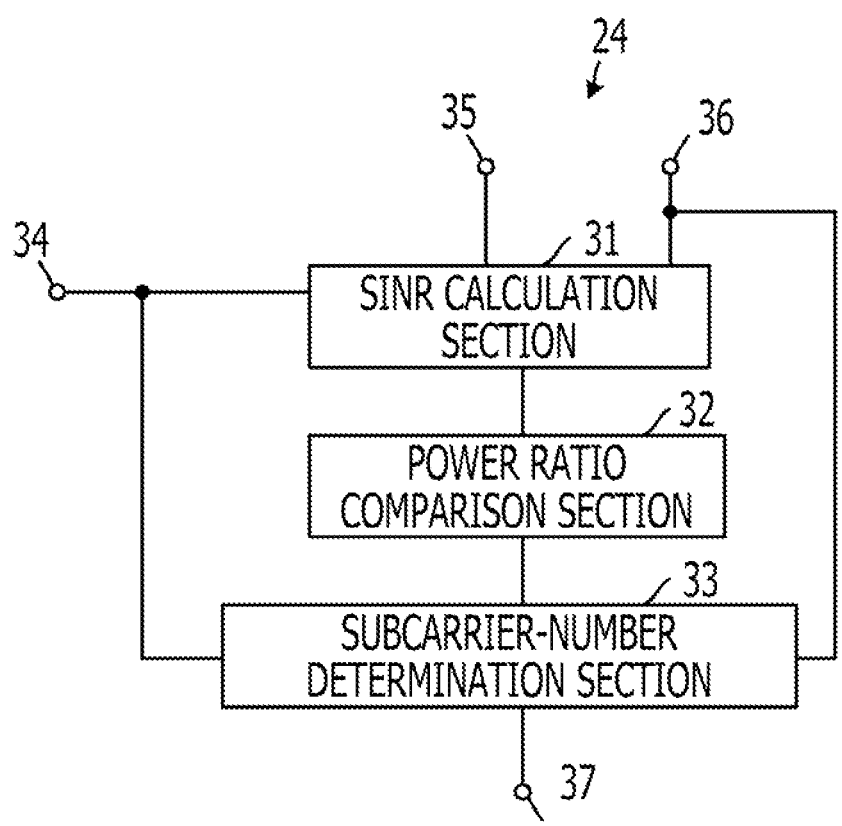
FIG. 4 is a block diagram illustrating an ICI cancellation subcarrier-number determination section.

FIG. 4 is a block diagram illustrating the ICI cancellation subcarrier-number determination section. As illustrated in FIG. 4, the ICI cancellation subcarrier-number determination section 24 includes an SINR calculator 31, a power ratio comparison section 32, and a subcarrier-number determination section 33.

The SINR calculator 31 is connected to an input terminal 34 to which the reception power measurement value of each subcarrier is input, an input terminal 35 to which a channel estimation value is input, and an input terminal 36 to which an ICI transfer function estimation value is input. The power ratio comparison section 32 is connected to the SINR calculator 31. The subcarrier-number determination section 33 is connected to the power ratio comparison section 32, the input terminal 34 to which the reception power measurement value is input, and the input terminal 36 to which the ICI transfer function estimation value is input.

On the basis of the reception power measurement value of each subcarrier, the channel estimation value, and the ICI transfer function estimation value, the SINR calculator 31 calculates SINR of each subcarrier. The power ratio comparison section 32 compares SINR output from the SINR calculator 31 with a preliminarily set threshold value. On the basis of the comparison result of SINR output from the power ratio comparison section 32, the reception power measurement value, and the ICI transfer function estimation value, the subcarrier-number determination section 33 determines the number of subcarriers to be ICI components and to be removed, with respect each subcarrier.

For example, when SINR is greater than the threshold value (alternatively, greater than or equal to the threshold value), the subcarrier-number determination section 33 may also set the number of subcarriers to be removed as ICI components to "0". For example, when SINR is less than or equal to the threshold value (alternatively, less than the threshold value), the subcarrier-number determination section 33 determines the number of subcarriers to be removed as ICI components in order from a subcarrier side close to a watched subcarrier until SINR of the corresponding watched subcarrier becomes greater than the threshold value (alternatively, greater than or equal to the threshold value). The subcarrier-number determination section 33 outputs, to an output terminal 37, the removed number of determined subcarriers to be ICI components.

The threshold value compared with SINR in the power ratio comparison section 32 depends on a characteristic to be a target. For example, as an example of the characteristic to be a target, a bit error rate (BER) characteristic or a packet error rate (PER) characteristic may be cited. When the targeted characteristic is good, the threshold value of SINR becomes large. When the targeted characteristic is bad, the threshold value of SINR becomes small. For example, when the characteristic to be a target is BER, the threshold value when BER to be a target is $10^{-2}$ may be 15 dB. For example, the threshold value when BER to be a target is $10^{-3}$ may be 25 dB.

In addition, an upper limit may also be set on the number of subcarriers to be removed as ICI components in the subcarrier-number determination section 33. By setting the upper limit on the number of subcarriers to be removed, it is possible to reduce an arithmetic operation amount when the removal number of subcarriers is obtained in the subcarrier-number determination section 33.

Example Applied to OFDM Method

Figure 5:
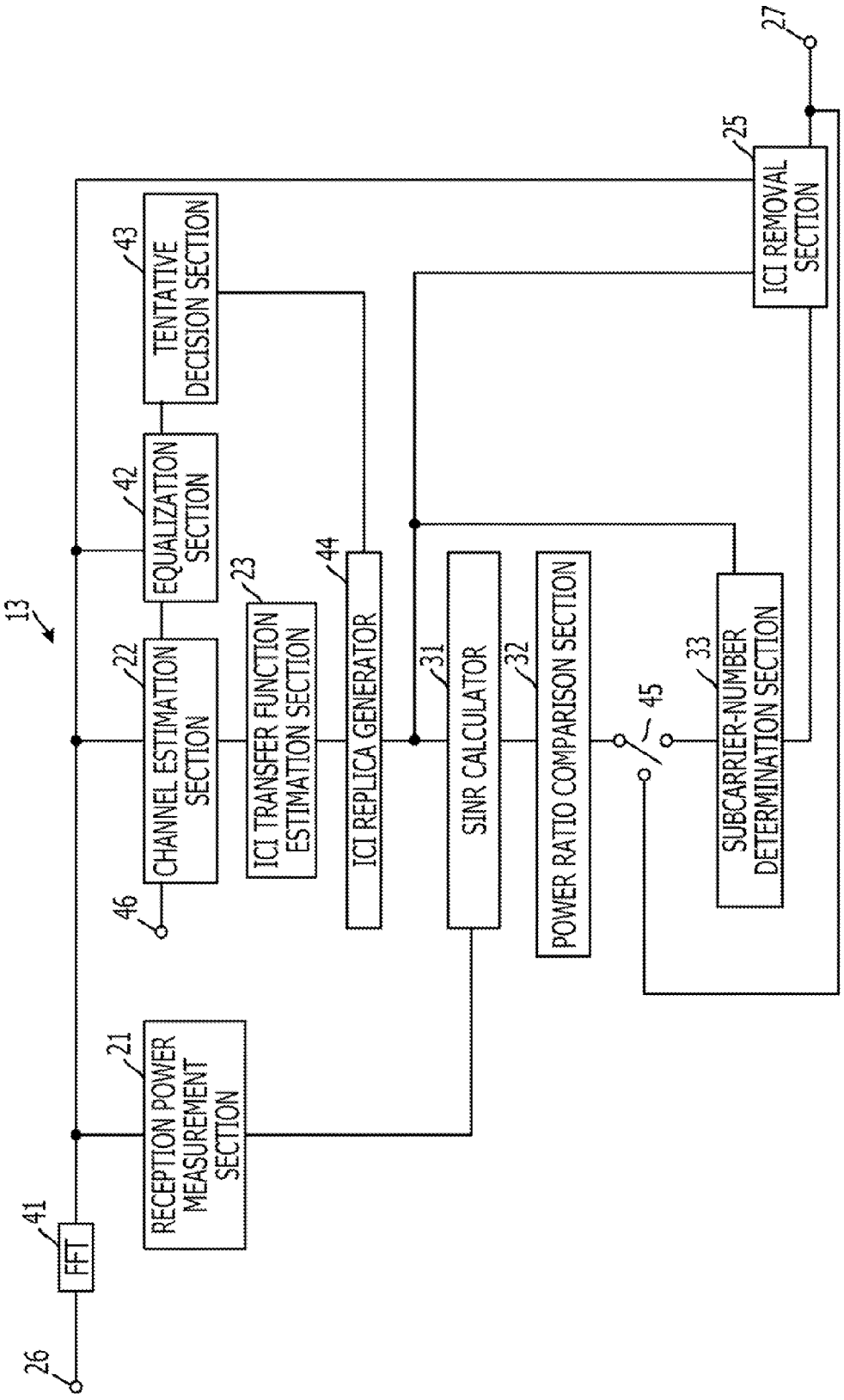
FIG. 5 is a block diagram illustrating an example of the wireless reception device according to the second embodiment.

FIG. 5 is a block diagram illustrating an example of the wireless reception device according to the second embodiment. An example illustrated in FIG. 5 is an example in which the wireless reception device according to the second embodiment is applied to an OFDM method. The ICI cancellation section 13 in the wireless reception device 1 includes an FFT 41, a reception power measurement section 21, a channel estimation section 22, an equalization section 42, a tentative decision section 43, an ICI transfer function estimation section 23, an ICI replica generator 44, an SINR calculator 31, a power ratio comparison section 32, a subcarrier-number determination section 33, and an ICI removal section 25.

The FFT 41 is connected to the input terminal 26 to which each subcarrier of the reception signal is input. The reception power measurement section 21 is connected to the FFT 41. The channel estimation section 22 is connected to the FFT 41 and an input terminal 46 to which a known transmission sequence is input. The equalization section 42 is connected to the FFT 41 and the channel estimation section 22. The tentative decision section 43 is connected to the equalization section 42. The ICI transfer function estimation section 23 is connected to the channel estimation section 22. The ICI replica generator 44 is connected to the ICI transfer function estimation section 23 and the tentative decision section 43.

The SINR calculator 31 is connected to the reception power measurement section 21 and the ICI replica generator 44. The power ratio comparison section 32 is connected to the SINR calculator 31. The subcarrier-number determination section 33 is connected to the power ratio comparison section 32 through a switching section 45. The switching section 45 switches the output destination of the power ratio comparison section 32 between the subcarrier-number determination section 33 and the output terminal 27. The subcarrier-number determination section 33 is connected to the ICI replica generator 44. The ICI removal section 25 is connected to the FFT 41, the ICI replica generator 44, and the subcarrier-number determination section 33. The output terminal 27 is connected to the ICI removal section 25.

The FFT 41 fast-Fourier-transforms and converts a reception signal $y_t$ into a signal $Y_k$ in a frequency domain. $Y_k$ is expressed by the following Expression (8), using $y_t$. "t" indicates a sample number, "k" indicates a subcarrier number, and N indicates the number of points of FFT in Expression (8). "$y_t$" indicates the reception signal of a t-th sample, and $Y_k$ indicates the reception signal of a k-th subcarrier.

$$Y_k = \sum_{t=0}^{N-1} y_t \exp(-j2\pi kt/N) \tag{8}$$

The reception power measurement section 21 measures the reception power of each subcarrier with respect to the output of the FFT 41. The reception power $P_k$ of the k-th subcarrier is expressed by the following Expression (9), using $Y_k$.

$$P_k = |Y_k|^2 \tag{9}$$

The channel estimation section 22 divides the output of the FFT 41 by the known transmission sequence input from the input terminal 46, and performs interpolation in a subcarrier direction, thereby estimating a channel. The following Expression (10) expresses the channel estimation value of the k-th subcarrier.

$$\hat{H}_k \tag{10}$$

The equalization section 42 divides the output of the FFT 41 by the channel estimation value, thereby performing equalization processing. The tentative decision section 43 tentatively decides a signal based on the output of the equalization section 42. The following Expression (11) expresses the transmission signal replica of the k-th subcarrier obtained based on tentative decision.

$$\hat{H}_k \tag{11}$$

On the basis of the output of the channel estimation section 22, the ICI transfer function estimation section 23 estimates the ICI transfer function $\hat{H}_{k,k'}$ of another subcarrier (k'-th subcarrier) leaking in a watched subcarrier (k-th subcarrier). "^ H" indicates that "^" is indexed on "H". For example, as an example of a method for estimating the ICI transfer function, as described in the above-mentioned related art of Karsten Schmidt et al., a method is cited in which the estimation is performed based on the channel estimation value of a symbol adjacent to the watched symbol.

On the basis of the output of the ICI transfer function estimation section 23 and the output of the tentative decision section 43, the ICI replica generator 44 calculates the ICI component of the other subcarrier (k'-th subcarrier) leaking in the watched subcarrier (k-th subcarrier). The ICI component of the k'-th subcarrier in the k-th subcarrier is expressed by the following Expression (12).

$$ICI_k = \sum_{\substack{k'=0 \\ k' \neq k}}^{N-1} \hat{H}_{k,k'} \hat{X}_{k'} \tag{12}$$

On the basis of the output of the ICI replica generator 44 and the output of the reception power measurement section 21, the SINR calculator 31 calculates SINR of the watched subcarrier (k-th subcarrier). SINR of the k-th subcarrier is expressed by the following Expression (13). $\sigma^2$ indicates noise power.

$$SINR_k = \frac{P_k - |ICI_k|^2 - \sigma^2}{|ICI_k|^2 + \sigma^2} \tag{13}$$

The power ratio comparison section 32 compares the output of the SINR calculator 31 with a preliminarily set threshold value. When $SINR_k$ of the k-th subcarrier is greater than the threshold value (alternatively, greater than or equal to the threshold value), the switching section 45 switches the output destination of the power ratio comparison section 32 to an output terminal 27 side. Accordingly, the removal of the ICI component by the ICI removal section 25 is not performed. When $SINR_k$ of the k-th subcarrier is less than or equal to the threshold value (alternatively, less than the threshold value), the switching section 45 switches the output destination of the power ratio comparison section 32 to a subcarrier-number determination section 33 side.

On the basis of the output of the power ratio comparison section 32, the subcarrier-number determination section 33 determines the optimum removal number of subcarriers (k'-th subcarriers) to be ICI components in the watched subcarrier (k-th subcarrier). An algorithm for determining the removal number of subcarriers to be ICI components will be described later. If it is assumed that the number of subcarriers to be ICI components in the k-th subcarrier is $G_k$, SINR of the k-th subcarrier after subcarriers to be ICI components have been cancelled is expressed by the following Expression (14).

$$SINR_k(G_k) = \frac{P_k - |ICI_k|^2 - \sigma^2}{\left| ICI_k - \sum_{\substack{k'=k-G_k \\ k' \neq k}}^{k+G_k} \hat{H}_{k,k'} \hat{X}_{k'} \right|^2 + \sigma^2} \quad (14)$$

On the basis of the output of the power ratio comparison section 32 and the output of the ICI replica generator 44, the subcarrier-number determination section 33 determines the optimum removal number of subcarriers (k'-th subcarriers) to be ICI components in the watched subcarrier (k-th subcarrier). For example, the subcarrier-number determination section 33 increases the value of $G_k$ from "0" until $SINR_k(G_k)$ exceeds the threshold value (alternatively, becomes greater than or equal to the threshold value) in Expression (14). Accordingly, the subcarrier-number determination section 33 can determine the optimum removal number of subcarriers (k'-th subcarriers) to be ICI components in the watched subcarrier (k-th subcarrier). In addition, in the subcarrier-number determination section 33, by setting an upper limit on the number of subcarriers to be removed as ICI components, an arithmetic operation amount when the removal number of subcarriers is obtained may be reduced.

On the basis of the output of the subcarrier-number determination section 33 and the output of the ICI replica generator 44, the ICI removal section 25 removes ICI components from the output signal of the output FFT 41. A signal after ICI components have been removed is expressed by the following Expression (15).

$$\tilde{Y}_k = Y_k - \sum_{\substack{k'=k-G_k \\ k' \neq k}}^{k+G_k} \hat{H}_{k,k'} \hat{X}_{k'} \quad (15)$$

Figure 6:
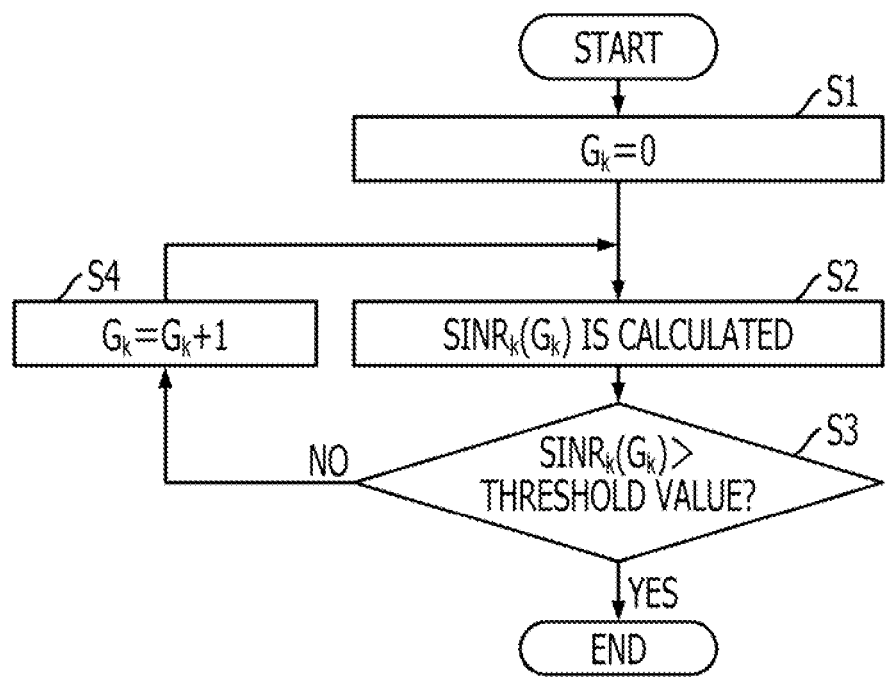
FIG. 6 is a flowchart illustrating an algorithm for determining a removal number of subcarriers to be ICI components.

Description of Algorithm for Determining Removal Number (without Upper Limit) of Subcarriers to be ICI Components FIG. 6 is a flowchart illustrating an algorithm for determining the removal number of subcarriers to be ICI components. As illustrated in FIG. 6, first, in the subcarrier-number determination section 33, the value of $G_k$ is set to "0" (Step S1). Next, in accordance with the above-mentioned Expression (14), $SINR_k(G_k)$ is calculated (Step S2). Next, it is determined whether or not $SINR_k(G_k)$ is greater than the threshold value (alternatively, whether or not $SINR_k(G_k)$ is greater than or equal to the threshold value) (Step S3).

When $SINR_k(G_k)$ is greater than the threshold value (alternatively, greater than or equal to the threshold value) (Step S3: Yes), the processing is terminated. When $SINR_k(G_k)$ is not greater than the threshold value (alternatively, not greater than nor equal to the threshold value) (Step S3: No), the value of $G_k$ is incremented (Step S4), and the processing returns to Step S2. In addition, when processing operations from Step S2 to Step S4 are repeated and $SINR_k(G_k)$ exceeds the threshold value (alternatively, becomes greater than or equal to the threshold value) (Step S3: Yes), the processing is terminated.

Figure 7:
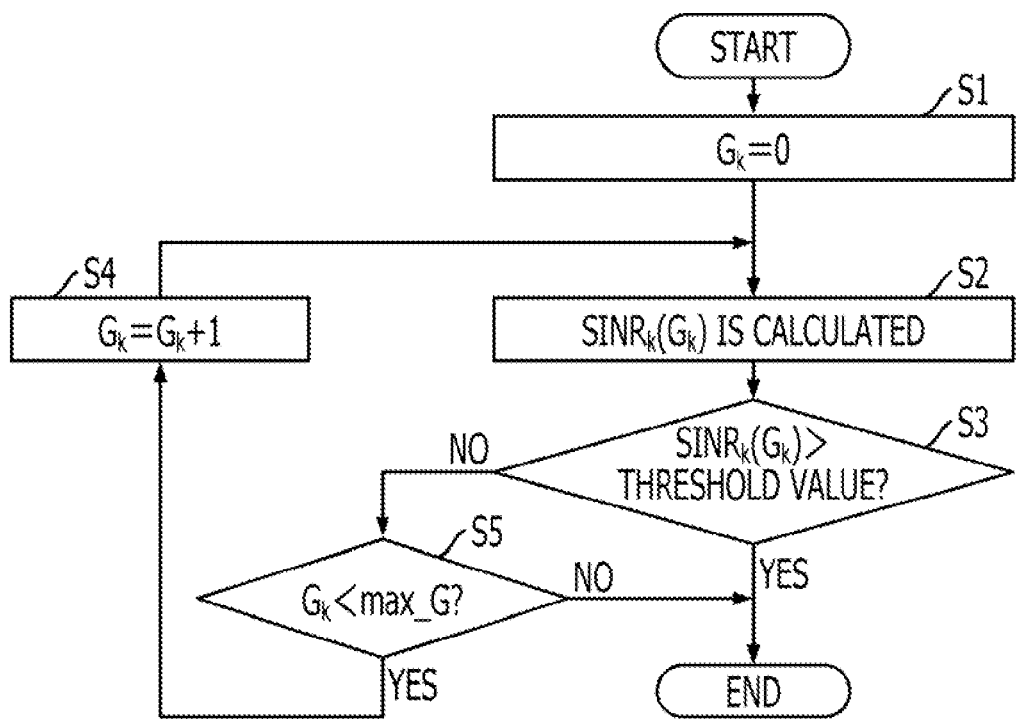
FIG. 7 is a flowchart illustrating an algorithm for determining a removal number of subcarriers to be ICI components.

Description of Algorithm for Determining Removal Number (with Upper Limit) of Subcarriers to be ICI Components FIG. 7 is a flowchart illustrating an algorithm for determining a removal number of subcarriers to be ICI components. An upper limit value max_G is set on the removal number of subcarriers to be ICI components. As illustrated in FIG. 7, in the subcarrier-number determination section 33, when $SINR_k(G_k)$ is not greater than the threshold value (alternatively, not greater than nor equal to the threshold value) (Step S3: No), it is determined whether or not the value of current $G_k$ is less than max_G (Step S5). When the value of $G_k$ is less than max_G (Step S5: Yes), the processing proceeds to Step S4, and the value of $G_k$ is incremented. In addition, the processing returns to Step S2. When the value of $G_k$ is not less than max_G (Step S5: No), the processing is terminated.

According to the second embodiment, the same advantageous effect as the first embodiment is obtained.

Figure 8:
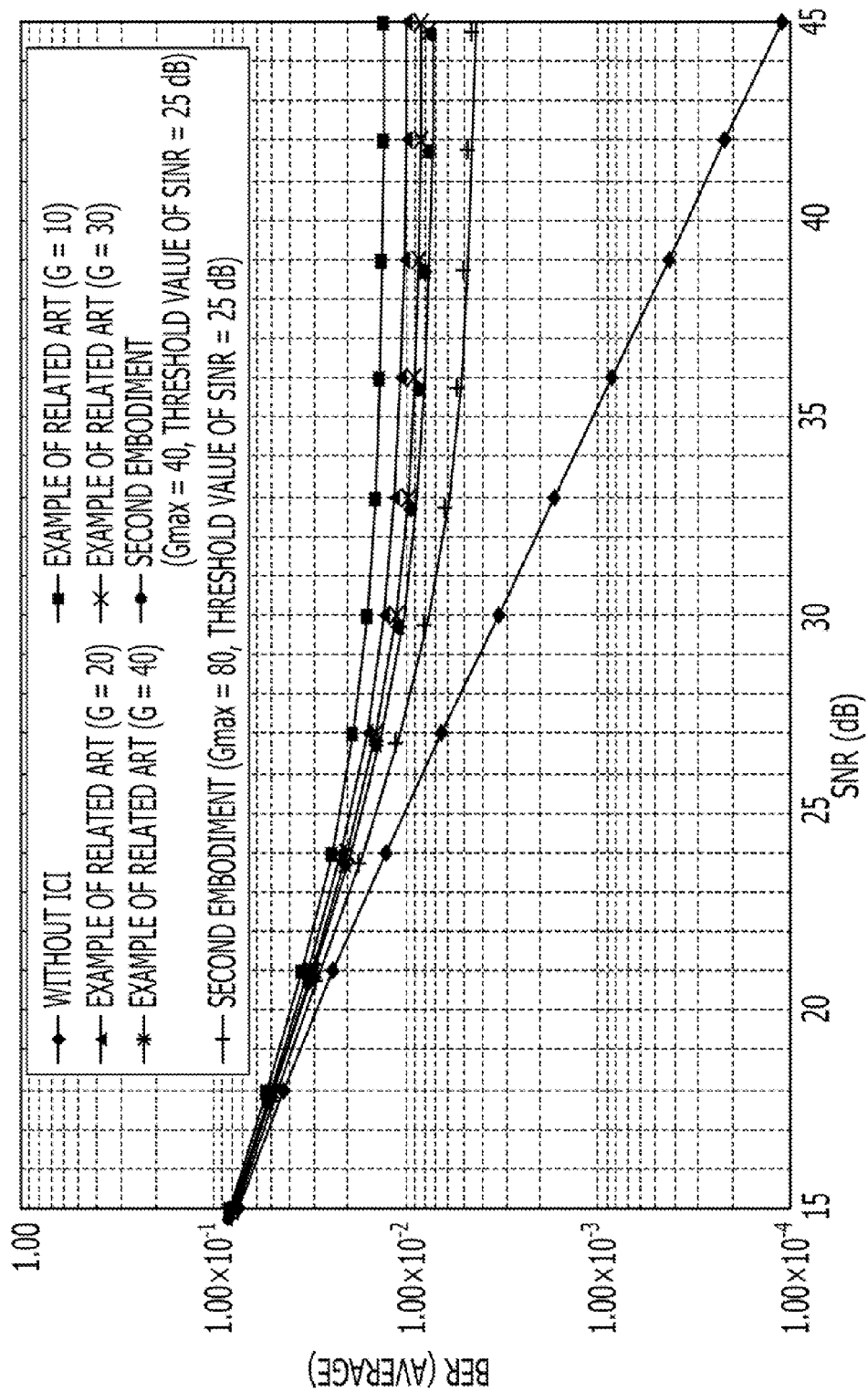
FIG. 8 is a graphic chart illustrating an example of an advantageous effect of the second embodiment.

FIG. 8 is a graphic chart illustrating an example of the advantageous effect of the second embodiment. A vertical axis is BER (average), and a horizontal axis is SNR (dB). A normalized Doppler frequency is 0.08. The threshold value of SINR is 25 dB. The upper limit value (Gmax) of the removal number of subcarriers to be ICI components is 40 or 80. The modulation method of a signal is 64QAM. In addition, by way of comparison, in FIG. 8, an example of the related art is illustrated in which the removal number G of subcarriers to be ICI components is preliminarily defined as 10, 20, 30, or 40. The removal number of subcarriers to be ICI components, selected in response to SNR, varies.

For example, in a case in which SNR is 35 dB, in the second embodiment when the upper limit value Gmax of the removal number of subcarriers to be ICI components is 40, the average value of the removal number of subcarriers to be ICI components is about 12.46. On the other hand, an example of the related art in which the same BER as the second embodiment is obtained is an example in which the removal number of subcarriers to be ICI components is 40. Accordingly, according to the second embodiment, an equivalent characteristic is obtained using about ⅓ of the arithmetic operation amount of an example of the related art. In addition, in the second embodiment when the upper limit value Gmax of the removal number of subcarriers to be ICI components is 80, the average value of the removal number of subcarriers to be ICI components is about 21.06. Accordingly, an equivalent characteristic is obtained using an arithmetic operation amount less than that of an example of the related art.

Figure 9:
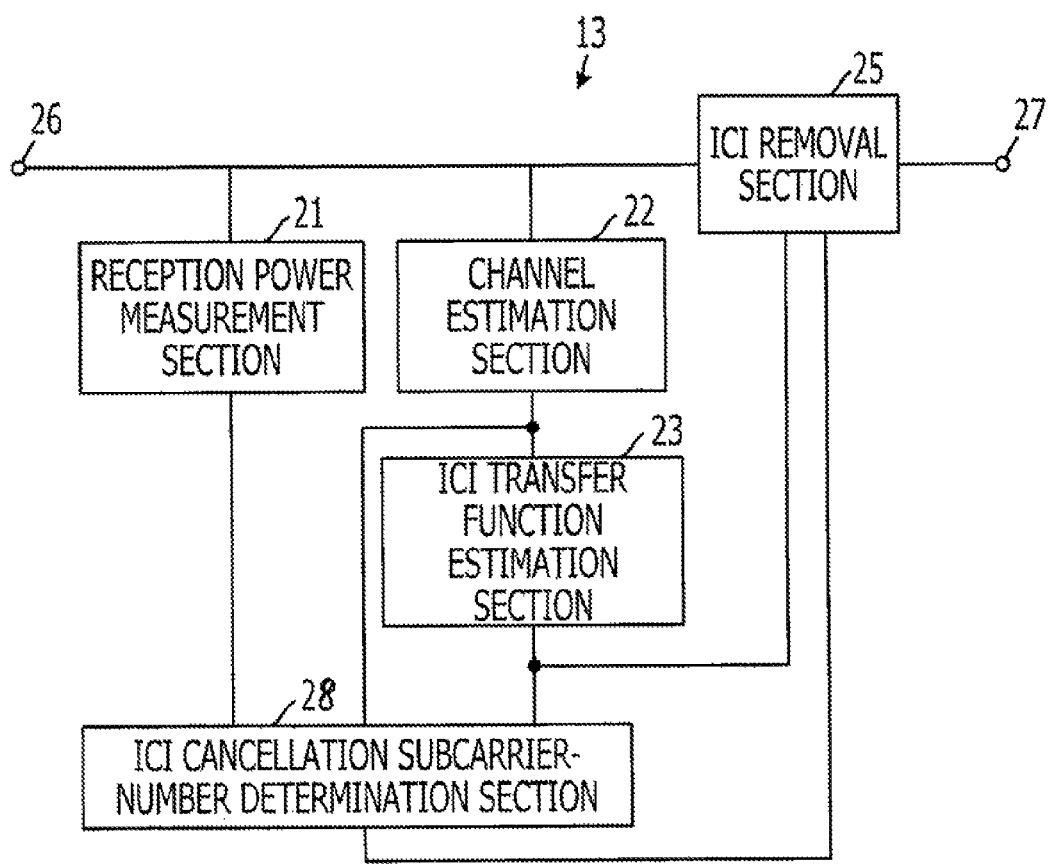
FIG. 9 is a block diagram illustrating a main part configuration of a wireless reception device according to a third embodiment.

(Third Embodiment) Description of Main Part Configuration of Wireless Reception Device FIG. 9 is a block diagram illustrating the main part configuration of a wireless reception device according to a third embodiment. As illustrated in FIG. 9, for example, in the configuration of the second embodiment, the ICI cancellation section 13 in the wireless reception device 1 includes, as the determination section, an ICI cancellation subcarrier determination section 28 in place of the ICI cancellation subcarrier-number determination section 24. The ICI cancellation subcarrier determination section 28 is connected to the reception power measurement section 21, the channel estimation section 22, and the ICI transfer function estimation section 23. The ICI removal section 25 is connected to the input terminal 26 to which each subcarrier of the reception signal is input, the ICI transfer function estimation section 23, and the ICI cancellation subcarrier determination section 28.

On the basis of the reception power measurement value of each subcarrier, output from the reception power measurement section 21, a channel estimation value, and an ICI transfer function estimation value output from the ICI transfer function estimation section 23, with respect to each subcarrier, the ICI cancellation subcarrier determination section 28 determines subcarriers to be removed, from among subcarriers to be ICI components for the corresponding subcarrier. On the basis of the ICI transfer function estimation value and the subcarriers to be removed determined by the ICI cancellation subcarrier determination section 28, the ICI removal section 25 removes subcarriers to be ICI components from each subcarrier. The other configuration is the same as the second embodiment.

Description of ICI Cancellation Subcarrier Determination Unit

Figure 10:
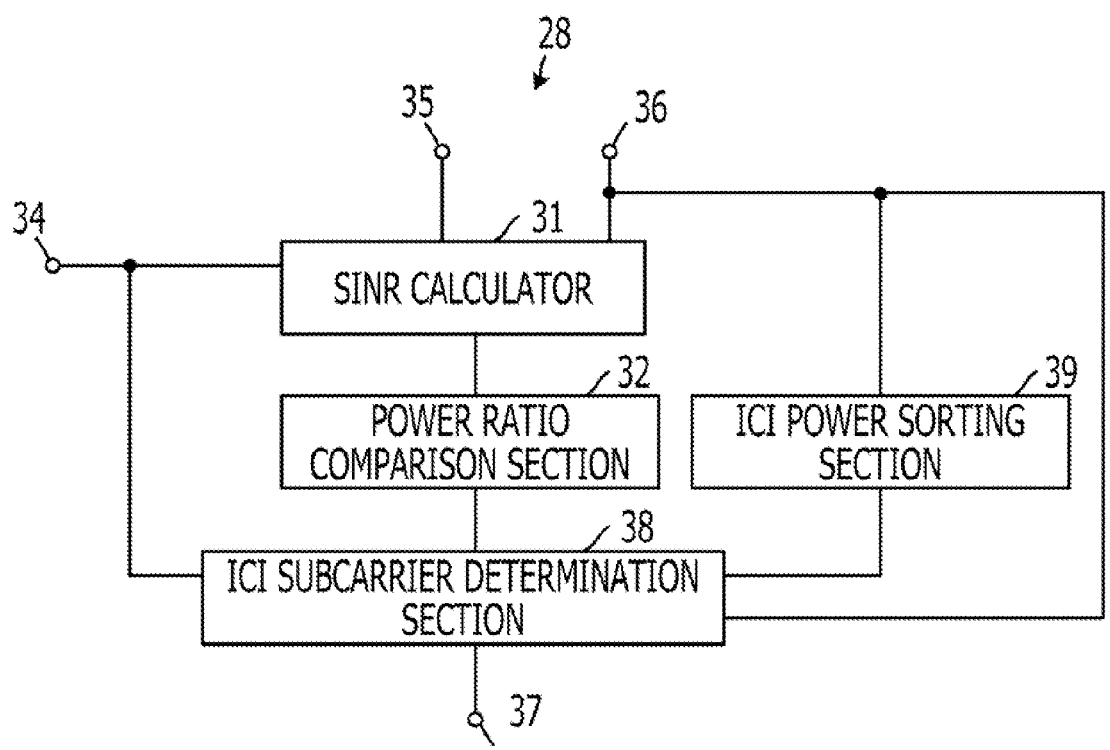
FIG. 10 is a block diagram illustrating an ICI cancellation subcarrier determination section.

FIG. 10 is a block diagram illustrating the ICI cancellation subcarrier determination section. As illustrated in FIG. 10, the ICI cancellation subcarrier determination section 28 includes the SINR calculator 31, the power ratio comparison section 32, an ICI subcarrier determination section 38, and an ICI power sorting section 39. The ICI power sorting section 39 is connected to the input terminal 36 to which the ICI transfer function estimation value is input. The ICI subcarrier determination section 38 is connected to the input terminal 34 to which the reception power measurement value is input, the input terminal 36 to which the ICI transfer function estimation value is input, and the ICI power sorting section 39. The output terminal 37 is connected to the ICI subcarrier determination section 38.

On the basis of the ICI transfer function estimation value, the ICI power sorting section 39 arranges other subcarriers leaking in a watched subcarrier, in descending order of the electric power of the other subcarriers leaking in the watched subcarrier, and outputs the result as a sequence vector S. The following Expression (16) expresses the sequence vector S. $S_i$ indicates a subcarrier having the i-th largest electric power among the other subcarriers leaking in the watched subcarrier.

$$S = [S_1, S_2, \ldots, S_{N-1}] \quad (16)$$

On the basis of the comparison result of SINR, output from the power ratio comparison section 32, the reception power measurement value, the ICI transfer function estimation value, and the sequence vector S output from the ICI power sorting section 39, with respect each subcarrier, the ICI subcarrier determination section 38 determines subcarriers to be removed, from among subcarriers to be ICI components.

For example, when SINR is greater than the threshold value (alternatively, greater than or equal to the threshold value), the ICI subcarrier determination section 38 may also set subcarriers to be removed as ICI components to "0". For example, when SINR is less than or equal to the threshold value (alternatively, less than the threshold value), the ICI subcarrier determination section 38 determines subcarriers to be removed as ICI components, in descending order of the electric power of the other subcarriers leaking in the watched subcarrier until SINR of the corresponding watched subcarrier becomes greater than the threshold value (alternatively, greater than or equal to the threshold value). The ICI subcarrier determination section 38 outputs, to the output terminal 37, subcarriers to be ICI components and determined to be the targets of removal.

In addition, an upper limit may also be set on the number of subcarriers to be removed as ICI components in the ICI subcarrier determination section 38. By setting the upper limit on the number of subcarriers to be removed, it is possible to reduce an arithmetic operation amount when subcarriers to be the targets of removal are determined in the ICI subcarrier determination section 38. An algorithm for determining subcarriers to be the targets of removal will be described later. The other configuration is the same as the second embodiment.

Figure 11:
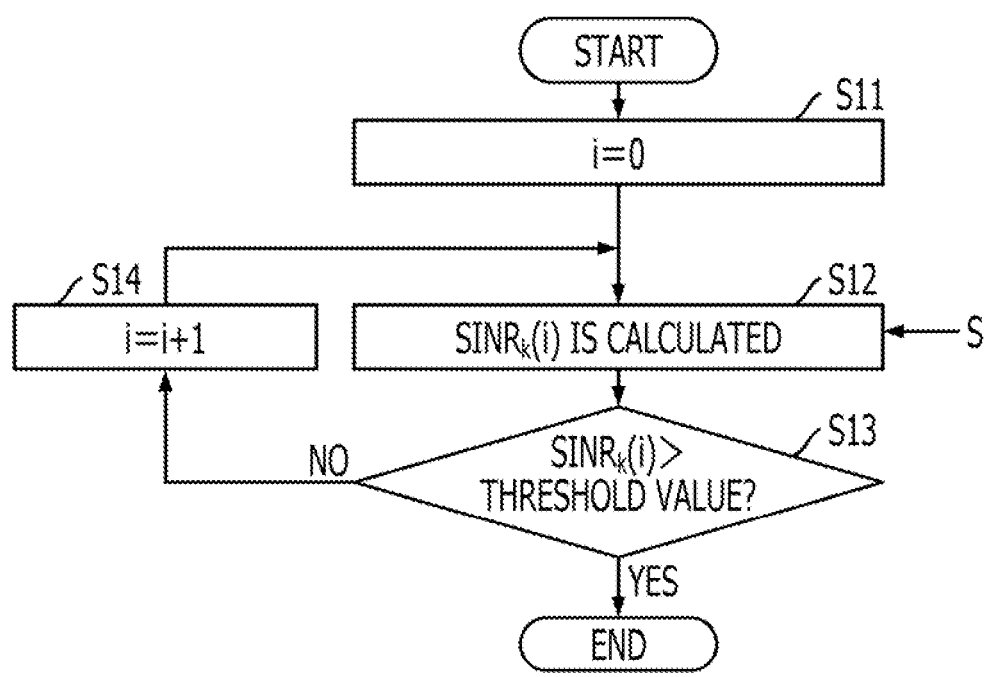
FIG. 11 is a flowchart illustrating an algorithm for determining a subcarrier of a removal target.

Description of Algorithm for Determining Subcarriers (without Upper Limit) of Removal Targets FIG. 11 is a flowchart illustrating an algorithm for determining a subcarrier of a removal target. As illustrated in FIG. 11, in the ICI subcarrier determination section 38, first, the value of i is set to "0" (Step S11). Next, $SINR_k(i)$ is calculated (Step S12).

Here, the ICI component of the subcarrier of a removal target from among other subcarriers leaking in the watched subcarrier (k-th subcarrier) is expressed by the following Expression (17). When the ICI component of the subcarrier of a removal target from among the other subcarriers leaking in the watched subcarrier (k-th subcarrier) is removed, SINR is expressed by the following Expression (18).

$$ICI(i) = \begin{cases} 0 & (i = 0) \\ \sum_{j=1}^{i} \hat{H}_{k,S_j} \hat{X}_{S_j} & \text{(otherwise)} \end{cases} \quad (17)$$

$$SINR_k(i) = \frac{P_k - |ICI_k|^2 - \sigma^2}{|ICI_k - ICI(i)|^2 + \sigma^2} \quad (18)$$

Next, it is determined whether or not $SINR_k(i)$ is greater than a threshold value (alternatively, whether or not $SINR_k(G_k)$ is greater than or equal to the threshold value) (Step S13). When $SINR_k(i)$ is greater than the threshold value (alternatively, greater than or equal to the threshold value) (Step S13: Yes), the processing is terminated. When $SINR_k(i)$ is not greater than the threshold value (alternatively, not greater than nor equal to the threshold value) (Step S13: No), the value of i is incremented (Step S14) and the processing returns to Step S12. In addition, when processing operations from Step S12 to Step S14 are repeated and $SINR_k(i)$ exceeds the threshold value (alternatively, becomes greater than or equal to the threshold value) (Step S13: Yes), the processing is terminated.

Figure 12:
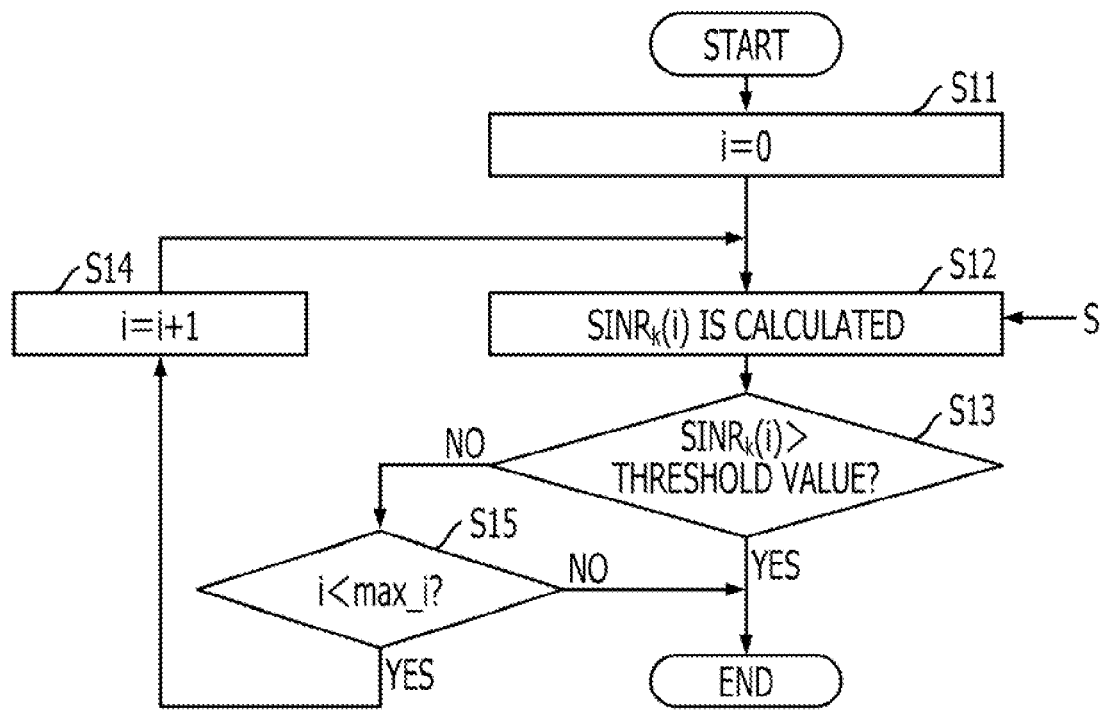
FIG. 12 is a flowchart illustrating an algorithm for determining a subcarrier of a removal target.

Description of Algorithm for Determining Subcarriers (with Upper Limit) of Removal Targets FIG. 12 is a flowchart illustrating an algorithm for determining a subcarrier of a removal target. An upper limit value max_i is set on the removal number of subcarriers to be ICI components. As illustrated in FIG. 12, in the ICI subcarrier determination section 38, when $SINR_k(i)$ is not greater than the threshold value (alternatively, not greater than nor equal to the threshold value) (Step S13: No), it is determined whether or not the current value of i is less than max_i (Step S15). When the value of i is less than max_i (Step S15: Yes), the processing proceeds to Step S14, and the value of i is incremented. In addition, the processing returns to Step S12. When the value of i is not less than max_i (Step S15: No), the processing is terminated.

According to the third embodiment, the same advantageous effect as the first embodiment is obtained.

(Fourth Embodiment)

Description of Main Part Configuration of Wireless Reception Device

Figure 13:
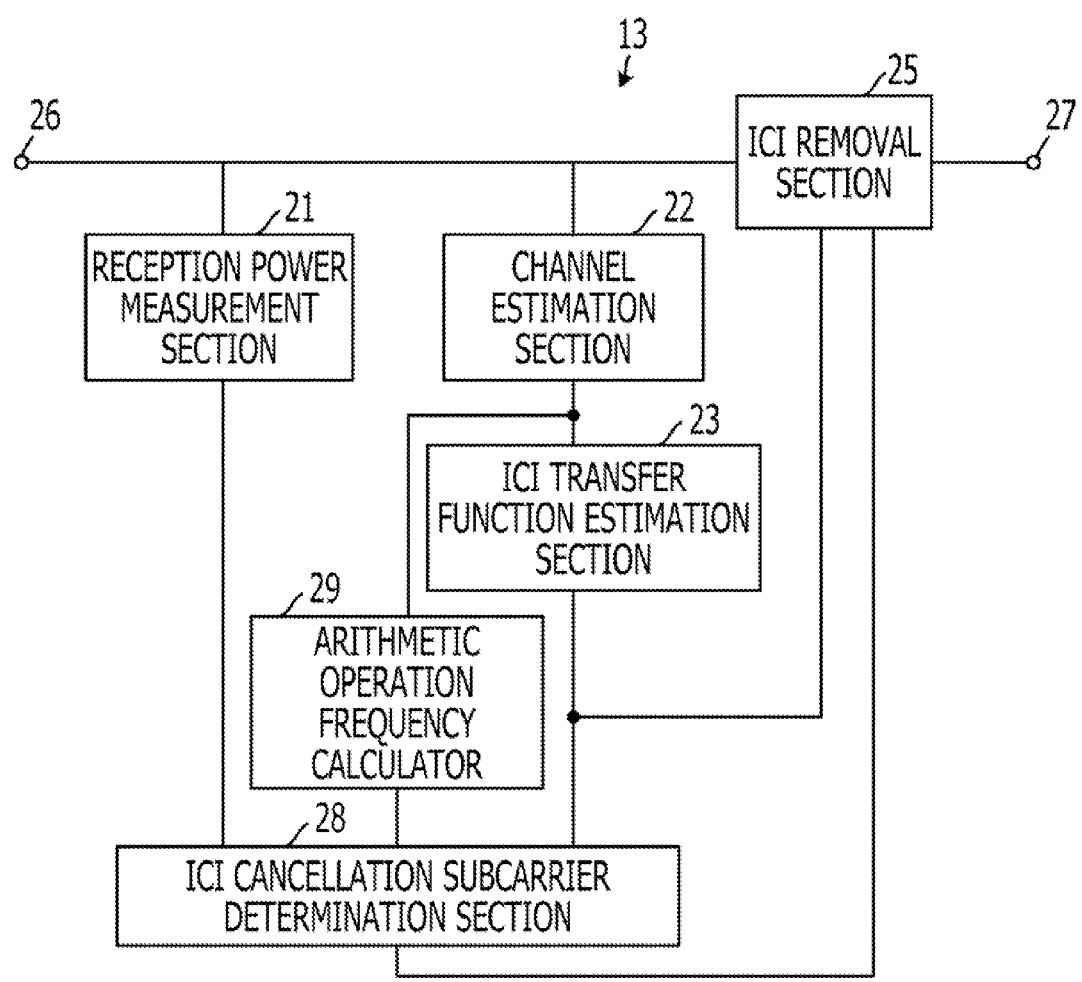
FIG. 13 is a block diagram illustrating a main part configuration of a wireless reception device according to a fourth embodiment.

FIG. 13 is a block diagram illustrating the main part configuration of a wireless reception device according to a fourth embodiment. As illustrated in FIG. 13, the ICI cancellation section 13 in the wireless reception device 1 includes an arithmetic operation frequency calculator 29 in the configuration of the fourth embodiment. The arithmetic operation frequency calculator 29 is connected to the channel estimation section 22. The ICI cancellation subcarrier determination section 28 is connected to the reception power measurement section 21, the arithmetic operation frequency calculator 29, and the ICI transfer function estimation section 23.

The arithmetic operation frequency calculator 29 estimates a Doppler frequency based on a channel estimation value. On the basis of the estimation value of the Doppler frequency, the arithmetic operation frequency calculator 29 calculates, for example as the number of symbols, the frequency of an arithmetic operation performed for determining the subcarrier of a removal target in the ICI cancellation subcarrier determination section 28. On the basis of the frequency calculated in the arithmetic operation frequency calculator 29, the ICI cancellation subcarrier determination section 28 performs the arithmetic operation for determining the subcarrier of a removal target. The other configuration is the same as the third embodiment.

Description of Arithmetic Operation Frequency Calculation Unit (Hardware)

Figure 14:
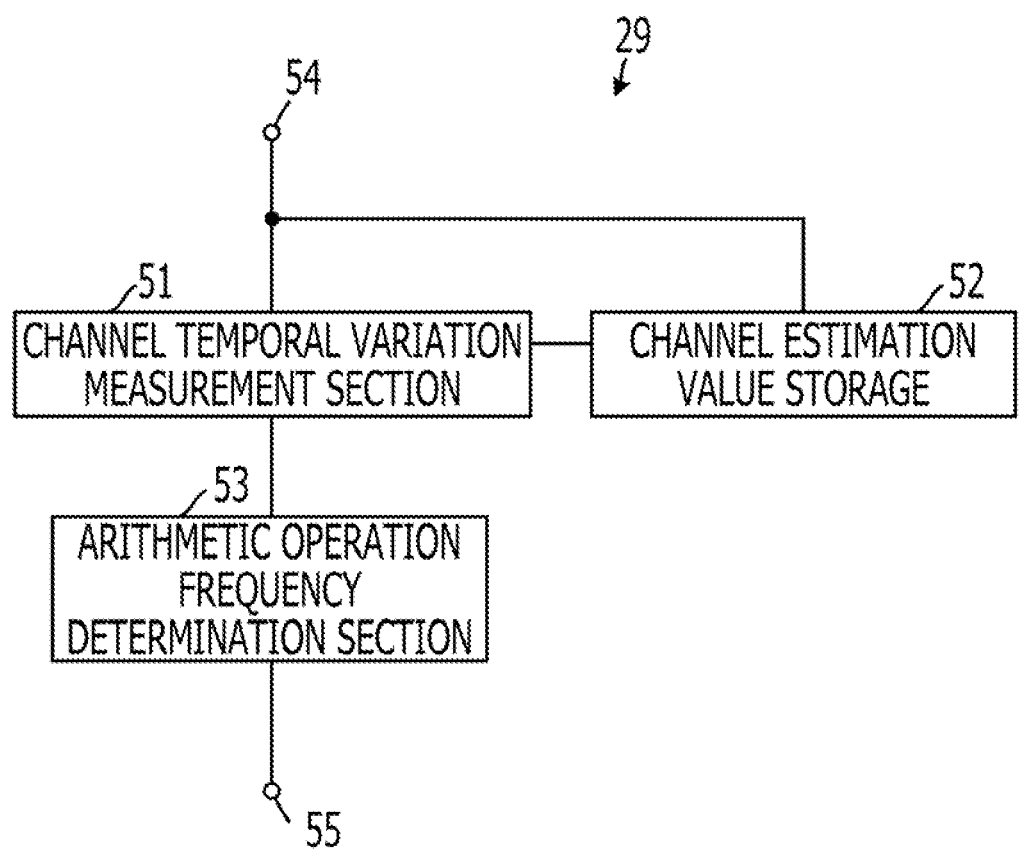
FIG. 14 is a block diagram illustrating an arithmetic operation frequency calculator.

FIG. 14 is a block diagram illustrating the arithmetic operation frequency calculator. As illustrated in FIG. 14, the arithmetic operation frequency calculator 29 includes a channel temporal variation measurement section 51, a channel estimation value storage 52, and an arithmetic operation frequency determination section 53. The channel estimation value storage 52 is connected to an input terminal 54 to which a channel estimation value is input. The channel temporal variation measurement section 51 is connected to the input terminal 54 to which the channel estimation value is input and the channel estimation value storage 52. The arithmetic operation frequency determination section 53 is connected to the channel temporal variation measurement section 51.

The channel estimation value storage 52 stores therein the channel estimation value of a watched symbol. The channel temporal variation measurement section 51 measures the temporal variation amount of a channel based on the current channel estimation value of the watched symbol and the past channel estimation value of the watched symbol, the past channel estimation value being output from the channel estimation value storage 52. For example, the temporal variation amount $\Delta_k$ of the channel of the watched subcarrier (k-th subcarrier) may be obtained based on the following Expression (19). $\hat{H}_{k,k}(t)$ indicates the channel estimation value of the k-th subcarrier at a time t.

$$\Delta_k = \hat{H}_{k,k}(t) - \hat{H}_{k,k}(t-1) \quad (19)$$

On the basis of the temporal variation amount of the channel, output from the channel temporal variation measurement section 51, the arithmetic operation frequency determination section 53 determines the frequency of the arithmetic operation performed for determining the subcarrier of a removal target in the ICI cancellation subcarrier determination section 28. For example, when the temporal variation amount of the channel is large, the arithmetic operation frequency determination section 53 may increase the frequency of the arithmetic operation, and when the temporal variation amount of the channel is small, the arithmetic operation frequency determination section 53 may decrease the frequency of the arithmetic operation.

Description of Arithmetic Operation Frequency Calculation Unit (Software Processing)

Figure 15:
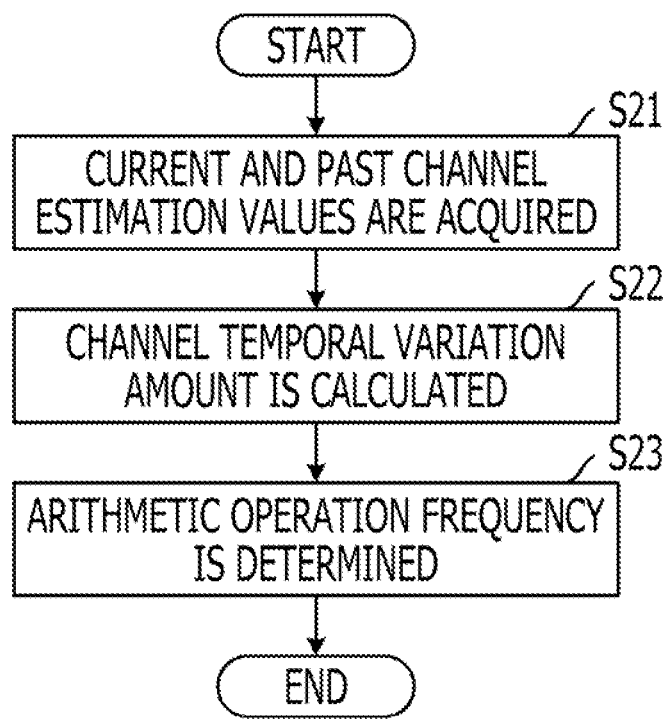
FIG. 15 is a flowchart illustrating an arithmetic operation frequency calculation procedure.

FIG. 15 is a flowchart illustrating an arithmetic operation frequency calculation procedure. The arithmetic operation frequency calculator 29 may be realized on the basis that a processor executes a program causing a computer to execute the arithmetic operation frequency calculation procedure illustrated in FIG. 15. The program has been stored in a memory. As illustrated in FIG. 15, when the arithmetic operation frequency calculation processing is started, first, with respect to a watched symbol, the processor acquires a current channel estimation value from the channel estimation section 22, and acquires a past channel estimation value from the memory (Step S21).

Next, the processor calculates a channel temporal variation amount based on the acquired current channel estimation value and the acquired past channel estimation value (Step S22). Next, based on the channel temporal variation amount, the processor determines the frequency of the arithmetic operation to be performed for determining the subcarrier of a removal target in the ICI cancellation subcarrier determination section 28 (Step S23). In addition, the processing is terminated.

According to the fourth embodiment, the same advantageous effect as the first embodiment is obtained. In addition, in the configuration of the second embodiment, a configuration may be adopted that includes the arithmetic operation frequency calculator 29.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments have been described in detail, it should be understood that the various changes, substitutions, and alterations could be made hereto without departing from the spirit and scope of the invention.

What is claimed is:

1. A wireless reception device comprising:
a memory; and
a processor coupled to the memory configured to:
determine, based on reception power of each of subcarriers of a multicarrier signal and a transfer function of each of the subcarriers, a value relating to an interference component between subcarriers, the interference component being from another subcarrier for each of the subcarriers, with respect to each of the subcarriers; and
remove the interference component from each of the subcarriers, based on the value relating to the interference component, wherein
the processor determines the other subcarriers relating to the interference component to be removed so that, when the interference component is removed in descending order of electric power of the interference component with respect to each of the subcarriers, a value of signal power of each of the subcarriers for electric power of the interference component or the value of the signal power for electric power of the interference component and a noise component becomes greater than or equal to a threshold value.

2. The wireless reception device according to claim 1, wherein
the value relating to the interference component includes the number of the other subcarriers relating to the interference component to be removed, or the other subcarriers relating to the interference component to be removed from among a plurality of subcarriers, with respect to each of the subcarriers.

3. The wireless reception device according to claim 1, wherein
the processor determines the number of the other subcarriers relating to the interference component to be removed so that, when the interference component is removed in order from a subcarrier close to each of the subcarriers, the value of signal power of each of the subcarriers for electric power of the interference component or the value of the signal power for electric power of the interference component and the noise component becomes greater than or equal to the threshold value.

4. The wireless reception device according to claim 3, wherein
the threshold value varies in response to an error rate of a reception signal.

5. The wireless reception device according to claim 1, wherein
the processor performs an arithmetic operation for determining the interference component between subcarriers, the interference component being for each of the subcarriers, based on a variation amount of a channel estimation value at a different time.

6. A wireless reception method comprising:
determining, based on reception power of each of subcarriers of a multicarrier signal and a transfer function of each of the subcarriers, a value relating to an interference component between subcarriers, the interference component being from another subcarrier for each of the subcarriers, with respect to each of the subcarriers; and
removing, using a processor, the interference component from each of the subcarriers, based on the value relating to the interference component, wherein
the determining determines the other subcarriers relating to the interference component to be subjected to the removal so that, when the interference component is removed in descending order of electric power of the interference component with respect to each of the subcarriers, a value of signal power of each of the subcarriers for electric power of the interference component or the value of the signal power for electric power of the interference component and a noise component becomes greater than or equal to a threshold value.

7. The wireless reception method according to claim 6, wherein
the value relating to the interference component includes the number of the other subcarriers relating to the interference component to be subjected to the removal, or the other subcarriers relating to the interference component to be subjected to the removal from among a plurality of subcarriers, with respect to each of the subcarriers.

8. The wireless reception method according to claim 6, wherein
the determining determines the number of the other subcarriers relating to the interference component to be subjected to the removal so that, when the interference component is removed in order from a subcarrier close to each of the subcarriers, the value of signal power of each of the subcarriers for electric power of the interference component or the value of the signal power for electric power of the interference component and the noise component becomes greater than or equal to the threshold value.

9. The wireless reception method according to claim 8, wherein
the threshold value varies in response to an error rate of a reception signal.

10. The wireless reception method according to claim 6, wherein
the determining performs an arithmetic operation to determine the interference component between subcarriers, the interference component being for each of the subcarriers, based on a variation amount of a channel estimation value at a different time.

11. A wireless communication system comprising:
a wireless reception device configured to:
    determine, based on reception power of each of subcarriers of a multicarrier signal and a transfer function of each of the subcarriers, a value relating to an interference component between subcarriers, the interference component being from another subcarrier for each of the subcarriers, with respect to each of the subcarriers; and
    remove the interference component from each of the subcarriers, based on the value relating to the interference component; and
a wireless transmission device configured to transmit the multicarrier signal to the wireless reception device, wherein
the wireless reception device determines the other subcarriers relating to the interference component to be removed by the removal section so that, when the interference component is removed in descending order of electric power of the interference component with respect to each of the subcarriers, a value of signal power of each of the subcarriers for electric power of the interference component or the value of the signal power for electric power of the interference component and a noise component becomes greater than or equal to a threshold value.

12. The wireless communication system according to claim 11, wherein
the value relating to the interference component includes the number of the other subcarriers relating to the interference component to be removed, or the other subcarriers relating to the interference component to be removed from among a plurality of subcarriers, with respect to each of the subcarriers.

13. The wireless communication system according to claim 11, wherein
the wireless reception device determines the number of the other subcarriers relating to the interference component to be removed so that, when the interference component is removed in order from a subcarrier close to each of the subcarriers, the value of signal power of each of the subcarriers for electric power of the interference component or the value of the signal power for electric power of the interference component and the noise component becomes greater than or equal to the threshold value.

14. The wireless communication system according to claim 13, wherein
the threshold value varies in response to an error rate of a reception signal.

15. The wireless communication system according to claim 11, wherein
the wireless reception device performs an arithmetic operation for determining the interference component between subcarriers, the interference component being for each of the subcarriers, based on a variation amount of a channel estimation value at a different time.

* * * * *